United States Patent

[11] 3,633,408

[72] Inventor Sidney F. Johnston, Jr.
Albuquerque, N. Mex.
[21] Appl. No. 70,970
[22] Filed Sept. 10, 1970
[45] Patented Jan. 11, 1972
[73] Assignee The United States of America as represented by the Secretary of the Air Force

[54] PRESSURIZED OMNIDIRECTIONAL STRESS TRANSDUCERS GAGE SYSTEM
2 Claims, 1 Drawing Fig.
[52] U.S. Cl. ............................................ 73/88 E, 73/409
[51] Int. Cl. ........................................ G01b 5/30
[50] Field of Search ............................ 73/388, 409, 88 E

[56] References Cited
UNITED STATES PATENTS
2,957,341 10/1960 Menard .................. 73/88 E Primary Examiner—Donald O. Woodiel
Attorneys—Harry A. Herbert, Jr. and Arsen Tashjian ABSTRACT: A system for taking transient subsurface pressure measurements at various depths in solid media. The system includes a source of liquid, a container assembly with a liquid-impervious, distensible, flexible and resilient container having an inlet and an outlet, a first hollow conduit from the source of liquid to the container inlet, a pump to move the liquid through the first conduit from the source to the inlet of the container, a transducer with pressure gage, and a second hollow conduit from the outlet of the container to the transducer. A hole is made in the solid medium and the container is lowered therein. The container is distended by filling it with the liquid from the liquid source until the outer surface of the container conforms to the configuration of the hole and the container becomes closely and completely coupled with the solid medium. Any pressure applied to the solid medium is transmitted to the liquid-filled container and, through the liquid, to the transducer.

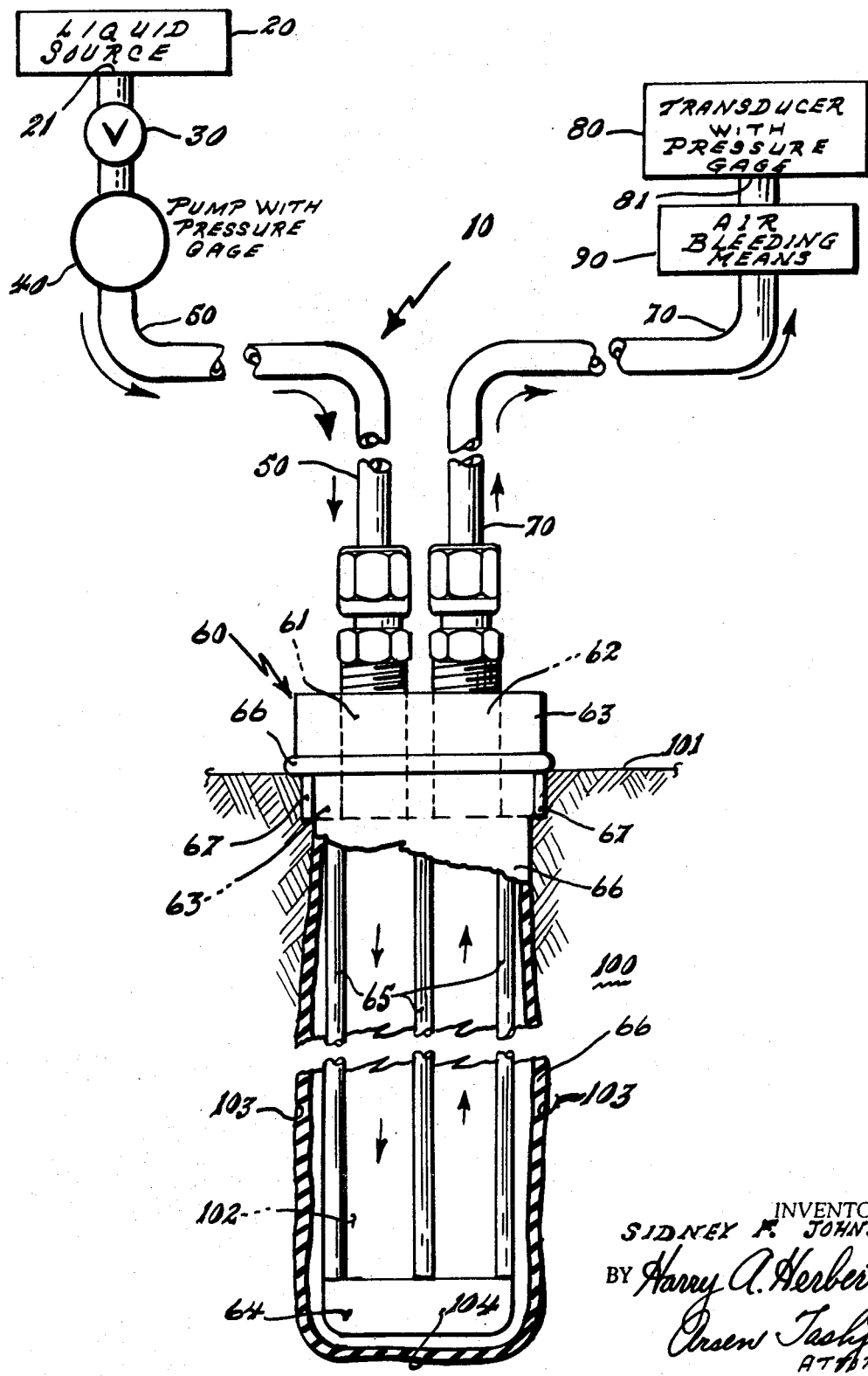

3,633,408

PRESSURIZED OMNIDIRECTIONAL STRESS TRANSDUCERS GAGE SYSTEM

BACKGROUND OF THE INVENTION

This invention relates to a system for taking transient subsurface pressure measurements at various depths in solid media, such as soil (i.e., earth), rock, concrete, mortar and the like.

Gages, and like apparatus, for measuring transient subsurface pressure and solid media are not new. They have been used, for example, to measure the subsurface pressure caused by the shock wave generated as a result of an atomic explosion. However, as far as is known by the applicant, these gages have suffered from one great disadvantage. That disadvantage is the inability to closely and completely couple the gage to the solid medium in which the pressure is to be measured.

There exists, therefore, a critical need for a gage, or the like, which can be closely and completely coupled with the surrounding solid medium. I have invented a system which permits this; and thereby I have significantly advanced the state-of-the-art.

SUMMARY OF THE INVENTION

This invention pertains to a pressurized omnidirectional stress transducer system for taking subsurface pressure measurements in solid media.

Therefore, an object of the invention is to provide apparatus which will take subsurface pressure measurements in solid media.

Another object of this invention is to provide apparatus which will permit close and complete coupling with the surrounding solid medium in which subsurface pressure is to be measured.

These objects, and others related thereto, will become readily apparent after a consideration of the description of the invention and of the drawing.

DESCRIPTION OF THE DRAWING

The drawing is a front elevational view, partially in cross section, partly fragmented and partially in schematic form, of a preferred embodiment of my invention.

DESCRIPTION OF THE PREFERRED EMBODIMENT

With reference to the drawing, therein is shown preferred embodiment 10 of the system which includes: liquid source 20, containing water, and having outlet 21; container assembly 60 with inlet 61 and outlet 62; a first hollow conduitlike member 50, preferably of one-fourth inch stainless steel tubing, connected at one end to outlet 21 of liquid source 20 and at the other end to inlet 61 of container assembly 60; valve 30 positioned between liquid source 20 and container assembly 60 to control the flow of water through conduitlike member 50, through inlet 61, and into container assembly 60; pump with pressure gage 40 connected to conduitlike member 50 at a location between valve 30 and inlet 61 to move the liquid (i.e., the water) from liquid source 20, through member 50 and into and through container assembly 60; transducer with pressure gage 80 and with inlet 81; a second hollow conduitlike member 70, preferably of one-fourth inch stainless steel tubing, connected at one end to inlet 81 of transducer 80 and at the other end to outlet 62 of container assembly 60; and air-bleeding means 90 connected to conduitlike member 70 at a location between outlet 62 of container assembly 60 and transducer 80, and near the latter.

It is here to be noted and understood that liquid source 20, valve 30, pump with pressure gage 40, transducer with pressure gage 80 and an air-bleeding means 90 are all conventional in the art.

Again with reference to the drawing, the container assembly 60 shown therein includes: an adapter top plate 63, preferably of hard brass, configurated in the form of two concentric cylinders of different diameters, with the larger diameter end on top, and the smaller diameter end on the bottom; inlet 61 and outlet 62, previously referred to, which are vertical apertures in adapter top plate 63; a circular bottom plate 64, which is preferably of hard brass; a plurality of rods 65, preferably made of brass, which are fixedly positioned to, and between adapter top plate 63 and bottom plate 64, with each said rod 65 circumferentially spaced and with one end of each rod 65 affixed to the bottom surface of adapter plate 63 and with the other end affixed to the top surface of bottom plate 64; an envelope or container 66, in the form of a hollow cylinder, open at the top end and closed at the other end, i.e., bottom, vertically disposed over and housing, the gage or frame formed by adapter top plate 63, bottom plate 64 and rods 65, with the container 66 made of distensible, flexible, resilient, liquid-impervious material, such as rubber; and an annular-shaped quick release clamp 67, such as a common-type hose clamp, securing and holding container 66, at its upper portion, against the smaller diameter end of adapter top plate 63.

Also shown in the drawing is solid medium 100, which in this case is the soil of the ground, with ground surface 101 and cavity or hole 102 having sides or walls 103 and bottom 104.

The flow of the liquid from liquid source 20 to transducer 80 is as indicated by the arrows in the drawing.

MODE OF OPERATION OF THE PREFERRED EMBODIMENT

When transient subsurface pressure in a solid medium is to be measured, container assembly 60 is placed, or is lowered, into a hole such as 102, in the solid medium, such as 100. The hole may be an existing one or may be especially formed by suitable means, such as by an auger. Air-bleeding means 90 is opened. Liquid from liquid source 20 is introduced into the system 10 by positioning valve 30 to the open mode and by actuating pump 40 to move the liquid, which is in this assumed case is water, through conduitlike member 50, through inlet 61, into container 66, through outlet 62, and into conduitlike member 70. Pumping of the liquid is continued until all air has been removed from system 10. Then, air-bleeding means 90 is closed. Pumping is resumed until container 66 is distended so as to conform with, and to become closely and completely coupled with, the sides 103 and the bottom 104 of hole 102 of soil medium 100, and until the desired preloading pressure is obtained. Pumping is then stopped and valve 30 is closed. It is to be noted that the pressure shown on transducer with pressure gage 80 is the same as the pressure shown on pump with pressure gage 40, since an increase of pressure in any part of a confined liquid causes an equal increase throughout the liquid. It is also to be noted that the system 10, and container 66, are pressurized and that container 66 is omnidirectional in that a transient stress from any direction in hole 102 will cause container 66 to be deformed inwardly in that direction. When this occurs, the liquid flows in conduitlike member 50 toward pump with pressure gage 40 and in conduitlike member 70 toward the transducer with pressure gage 80. The amount of the preloading pressure is then subtracted from the pressure reading resulting from the effect of the transient stress. The difference is the amount of pressure caused by the transient stress.

While there has been shown and described the fundamental features of the invention, as applied to preferred embodiment, it is to be understood that various substitutions and omissions may be made by those of ordinary skill in the art, without departing from the spirit of the invention. For example: (a) any liquid could be substituted for the water used in the preferred embodiment (b) the system may be used to measure transient subsurface pressure in liquid media; (c) the system may be used with container assembly 60 in any inverted position to measure pressure changes in mine and tunnel ceilings, and the like, or it may be used in any orientation and in that sense, is omnidirectional; and (d) the depth of the hole in which the container assembly 60 is placed may be much deeper than hole 102.

What is claimed is:

1. A system for measuring transient subsurface pressure in a solid medium, comprising:
   a. a source of liquid with said source having an outlet;
   b. a container assembly which includes;
      1. a metal adapter top plate configurated in the form of two concentric cylinders of different diameters, with the larger diameter end on top and the smaller diameter end on the bottom, and with said adapter top plate having a vertical inlet and a vertical outlet;
      2. a metal circular bottom plate;
      3. a plurality of metal rods fixedly positioned to, and between, said adapter top plate and said bottom plate, with each said rod circumferentially spaced, and with one end of each said rod affixed to the bottom surface of said adapter top plate and with the other end affixed to the top surface of said bottom plate, so as to form a cage;
      4. a container of distensible, flexible, resilient, liquid-impervious material in the form of a hollow cylinder, open at the top end and closed at the bottom end vertically disposed and housing the cage formed by said adapter top plate, said bottom plate, and said rods; and,
      5. an annular-shaped clamp, securing and holding said container at the top end against the smaller diameter end of said adapter top plate of said container assembly;
   c. a first hollow conduitlike member connected at one end to the outlet of said source of liquid and connected at the other end to the inlet in said adapter top plate of said container assembly;
   d. a valve, disposed between said source of liquid and said container assembly and connected to said first hollow conduitlike member, to control the flow of liquid through said first hollow conduitlike member from said source of liquid to said container assembly;
   e. a pump with pressure gage, with said pump disposed between said valve and said container assembly and connected to said first hollow conduitlike member, to move the liquid from said source of liquid to said container assembly;
   f. a transducer, with said transducer having an inlet;
   g. a second hollow conduitlike member connected at one end to the inlet of said transducer and connected at the other end to the outlet in said adapter plate of said container assembly; and,
   h. air-bleeding means, disposed between said transducer and said container assembly and connected to said second hollow conduitlike member.

2. The system, as set forth in claim 1, wherein said liquid is water.

* * * * *